United States Patent [19]

Some et al.

[11] Patent Number: 5,831,275
[45] Date of Patent: Nov. 3, 1998

[54] IMAGE FORMING APPARATUS

[75] Inventors: Masato Some; Takashi Kaneko, both of Kaisei-Machi, Japan

[73] Assignee: Fuji Photo Film Co., Ltd., Kanagawa, Japan

[21] Appl. No.: 400,589

[22] Filed: Mar. 8, 1995

[30] Foreign Application Priority Data

Apr. 15, 1994 [JP] Japan .................................. 6-077520

[51] Int. Cl.⁶ .................................................. G03B 42/02
[52] U.S. Cl. ........................................ 250/584; 250/583
[58] Field of Search .................... 250/584, 583; 364/413.13

[56] References Cited

U.S. PATENT DOCUMENTS

| | | | |
|---|---|---|---|
| 4,777,597 | 10/1988 | Shiraishi et al. | 364/413.01 |
| 4,865,967 | 9/1989 | Shiraishi et al. | 435/6 |
| 4,889,990 | 12/1989 | Hosoi et al. | 250/327.2 |
| 5,260,190 | 11/1993 | Shiraishi et al. | 435/6 |
| 5,270,162 | 12/1993 | Shiraishi et al. | 435/6 |
| 5,400,249 | 3/1995 | Soll et al. | 364/413.13 |

FOREIGN PATENT DOCUMENTS

| | | | |
|---|---|---|---|
| 59-15843 | 1/1984 | Japan | G01N 23/20 |
| 61-93538 | 5/1986 | Japan | H01J 37/20 |

OTHER PUBLICATIONS

Tateno et al., Computed Radiography, 1987, pp. 21–23.

*Primary Examiner*—David P. Porta
*Assistant Examiner*—David Vernon Bruce
*Attorney, Agent, or Firm*—Sughrue, Mion, Zinn, Macpeak & Seas, PLLC

[57] ABSTRACT

An image forming apparatus includes an image data memory for storing image data, a temporary memory for two-dimensionally mapping and temporarily storing the image data stored in the image data memory, an image data selecting section for selecting image data from among the image data stored in the temporary memory, an image data enlarging/reducing section for enlarging or reducing the selected image data, an enlarged/reduced image data memory for two-dimensionally mapping and temporarily storing the enlarged or reduced image data, a graphic data memory for storing graphic data to be displayed on a CRT together with the image data, a data synthesizing section for selecting graphic data to be displayed from among graphic data stored in the graphic data memory and synthesizing them and the image data stored in the enlarged/reduced image data memory, a synthesized data memory for two-dimensionally mapping and temporarily storing the synthesized image data and graphic data, a data area selecting section for selecting a part of a data area stored in the synthesized data memory, a window memory for two-dimensionally mapping and temporarily storing the part of the selected data area, and image displaying section for displaying an image on the CRT based on the data stored in the window memory. According to the thus constituted image forming apparatus, it is possible to form a visible image on the CRT based on image data which can scroll the image formed on the CRT at a high speed.

8 Claims, 7 Drawing Sheets

IMAGE FORMING APPARATUS

BACKGROUND OF THE INVENTION

The present invention relates to an image forming apparatus and, particularly, to such an apparatus which can improve viewing and analyzing characteristics of an arbitrary image area.

DESCRIPTION OF THE PRIOR ART

Various image analyzing methods are known. These include an autoradiographic process comprising the steps of introducing a radioactively labeled substance into an organism, using the organism or a part of the tissue of the organism as a specimen, placing the specimen and a radiographic film such as a high sensitivity type X-ray film together in layers for a certain period of time to expose the radiographic film thereto and obtaining locational information on the radioactively labeled substance in the specimen from the resolved pattern of the radiographic film. Another second method is a chemiluminescent process comprising the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, detecting the chemiluminescent emission in the wavelength of visible light generated by the contact of the chemiluminescent substance and the labeling substance and obtaining information relating to the high molecular substance such as genetic information. A third method uses an electron microscope and comprises the steps of irradiating a metal or nonmetal specimen with an electron beam, detecting a diffraction image, transmission image or the like and effecting elemental analysis, composition analysis, structural analysis of the specimen or the like, or irradiating the tissue of an organism with an electron beam and detecting an image of the tissue of the organism. A fourth method is a radiographic diffraction image detecting process comprising the steps of irradiating a specimen with radiation, detecting a radiographic diffraction image and effecting structural analysis of the specimen or the like.

Conventionally, these methods are carried out by employing a photographic film as a detecting material, recording a radiographic image, a chemiluminescent image, an electron microscopic image, a radiographic diffraction image or the like on the photographic film and observing a visual image with the eyes. However, in the case where a photographic film is employed as a detecting material, since a radiographic film has low sensitivity, there is a problem that it takes considerable time for recording an image in the autoradiographic process and the radiographic diffraction image detecting process. Further, in the chemiluminescent process, although it is necessary to employ a highly sensitive film having a high gamma value for detecting very weak chemiluminescent emission, when the highly sensitive film having a high gamma value is employed, it is difficult to expose the film reliably using a straight portion of the characteristic curve. Therefore, the film is often exposed improperly and it is necessary to repeatedly expose the films under various exposure conditions. Moreover, in the detecting process using the electron microscope, since the straight portion of the characteristic curve of a photographic film for an electron microscope is short, it is difficult to determine the proper exposure condition and it is necessary to repeatedly expose the films. Furthermore, in each process, it is necessary to chemically develop the films and, therefore, the operations are unavoidably complicated.

In view of the above, there has been proposed an autoradiographic process, a chemiluminescent process, a detecting process using an electron microscope and a radiographic diffraction image detecting process comprising the steps of employing, as a detecting material for the radiation, the visible light, the electron beam or the like, not a photographic film, but a stimulable phosphor. The stimulable phosphor sheet can absorb and store the energy of radiation, visible light, an electron beam or the like upon being irradiated therewith and releases an emission which is proportional to that of the received radiation, the visible light, the electron beam or the like upon being stimulated with an electromagnetic wave having a specific wavelength range. The stimulated emission released from the stimulable phosphor is photoelectrically, the detected signal is connected to a digital signal. A predetermined image processing is performed on the obtained image data, and an image is reproduced on a displaying means such as a CRT or the like or a photographic film (See for example, Japanese Patent Publication No. 1-60784, Japanese Patent Publication No. 1-60782, Japanese Patent Publication No. 4-3952, U.S. Pat. No. 5,028,793, UK Patent Application 2,246,197 A, Japanese Patent Application Laid Open No. 61-51738, Japanese Patent Application Laid Open No. 61-93538, Japanese Patent Application Laid Open No. 59-15843).

According to the detecting processes using the stimulable phosphor, chemical processing, becomes unnecessary. In addition, the exposure time can be significantly shortened in the autoradiographic process and the radiographic diffraction image detecting process. Improper exposure becomes rare, and the exposing operation is simplified in the chemiluminescent process and the detecting process using the electron microscope. Further, since the image is reproduced after the detected signal has been converted to a digital signal, the image can be reproduced in a desired manner by effecting signal processing on the image data, and it is also possible to effect quantitative analysis using a computer. Use of a stimulable phosphor in these processes is therefore advantageous.

In the case where image data are converted to an electrical signal using the stimulable phosphor sheet and are reproduced on a display means such as a CRT for viewing and analysis, it is often necessary to enlarge the image area of interest for display on a CRT or the like. However, it is not efficient to use a memory capable of storing the image data for the enlarged whole image because the memory would have to have an extremely large capacity.

For solving this problem, it is necessary to provide a first memory for two-dimensionally mapping and temporarily storing image data therein, image data selecting means for selecting a part of the image data stored in the first memory and a second memory for enlarging and storing the image data selected by the image data selecting means.

However, in the case where image data are reproduced on a CRT or the like to be viewed and analyzed, it is often necessary to display various patterns together with the image on the CRT or the like for detecting characteristics of a specified image area or for signal-processing the image data corresponding to the image area. In such cases, it is further necessary to synthesize graphic data and image data, two-dimensionally map and temporarily store the synthesized data in a third memory and display on a CRT or the like the data that was two-dimensionally mapped and temporarily stored in the third memory.

In the image forming apparatus for displaying an image corresponding to a part of the image data on a display means such as a CRT, it is necessary to scroll the image displayed on the CRT so that the image area to be viewed and analyzed can be displayed. However, in the image forming apparatus for scrolling the image displayed on the CRT or the like, there is no way to access the image data storing means, select a part of the image data stored in the first memory, store them in the second memory, synthesize graphic data and the image data, store the synthesized data in the third memory and display an image on the CRT or the like, and it is therefore impossible to scroll the image at a high speed.

The same problems occur in the case where, after an autoradiographic image, a chemiluminescent image, an electron microscopic image, a radiographic diffraction image or the like was recorded on a photographic film, the recorded image is photoelectrically read and converted to a digital signal. Thus the obtained image signal is signal processed in a desired manner, thereby reproducing a visible image on displaying means such as a CRT or the like or a photographic film.

SUMMARY OF THE INVENTION

It is therefore an object of the present invention to provide an image forming apparatus for forming a visible image on a display means, such as a CRT, based on image data and enables the image formed on the display means to be scrolled at a high speed.

The above and other objects of the present invention can be accomplished by an image forming apparatus comprising image data storing means for storing image data, temporary memory means for two-dimensionally mapping and temporarily storing the image data stored in the image data storing means, image data selecting means for selecting image data from among the image data two-dimensionally mapped and temporarily stored in the temporary memory means, image data enlarging/reducing means for enlarging or reducing the image data selected by the image data selecting means, enlarged/reduced image data storing means for two-dimensionally mapping and temporarily storing the image data enlarged or reduced by the image data enlarging/reducing means, graphic data storing means for storing graphic data to be displayed on displaying means together with the image data, data synthesizing means for selecting graphic data to be displayed on the displaying means from among graphic data stored in the graphic data storing means and synthesizing them and the image data two-dimensionally mapped and temporarily stored in the enlarged/reduced image data storing means, synthesized data storing means for two-dimensionally mapping and temporarily storing the image data and the graphic data synthesized by the data synthesizing means, data area selecting means for selecting a part of a data area stored in the synthesized data storing means, window memory means for two-dimensionally mapping and temporarily storing the part of the data area selected by the data area selecting means, and image displaying means for displaying an image on the displaying means based on the data two-dimensionally mapped and temporarily stored in the window memory means.

In a preferred aspect of the present invention, the image data is produced using a stimulable phosphor sheet.

In a further preferred aspect of the present invention, the image data constitute image data selected from a group consisting of autoradiographic image data, radiographic diffraction image data, electron microscopic image data and chemiluminescent image data.

In a still further preferred aspect of the present invention, the autoradiographic image data, the radiographic diffraction image data and the electron microscopic image data are produced by absorbing and storing the energy of radiation or electron beams emitted from a specimen in a stimulable phosphor, irradiating the stimulable phosphor with an electromagnetic wave and photoelectrically converting light emitted from the stimulable phosphor.

In a further preferred aspect of the present invention, the chemiluminescent image data are produced by absorbing and storing the energy of a visible light emitted from a specimen in a stimulable phosphor, irradiating the stimulable phosphor with an electromagnetic wave and photoelectrically converting light emitted from the stimulable phosphor.

In the present invention, the stimulable phosphor employed for producing an autoradiographic image, a radiographic diffraction image and an electron microscopic image may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, it is preferable to employ certain stimulable phosphors including alkaline earth metal fluorohalide phosphors $(Ba_{1-x},M^{2+}_{x})FX:yA$ (where $M^{2+}$ is at least one alkaline earth metal selected from the group consisting of Mg, Ca, Sr, Zn and Cd; X is at least one halogen selected from the group consisting of Cl, Br and I; A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2.) as disclosed in U.S. Pat. No. 4,239,968. Another phosphor is the alkaline earth metal fluorohalide phosphors SrFX:Z (where X is at least one halogen selected from the group consisting of Cl, Br and I; and Z is at least one of Eu and Ce.) as disclosed in Japanese Patent Application Laid Open No. 2-276997. Another set of phosphor is europium activated complex halide phosphors $BaFX.xNaX':aEu^{2+}$ (where each of X or X' is at least one halogen selected from the group consisting of Cl, Br and I; x is greater than 0 and equal to or less than 2; and y is greater than 0 and equal to or less than 0.2.) a disclosed in Japanese Patent Application Laid Open No. 589-56479. Another set of phosphor is cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1.) as disclosed in Japanese Patent Application Laid Open No. 58-69281. Another set of phosphor is cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1.) as disclosed in U.S. Pat. No. 4,539,137. Another set of phosphor is the europium activated complex halide phosphors $M^{II}FX.aM^{I}X'.bM^{II}X''_{2}.cM^{III}X'''_{3}.xA:yEu^{2+}$ (where $M^{II}$ is at least one alkaline earth metal selected from the group consisting of Ba, Sr and Ca; $M^{I}$ is at least one alkaline metal selected from the group consisting of Li, Na, K, Rb and Cs; $M^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X" and X'" is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2.) as disclosed in U.S. Pat. No. 4,962,047.

In the present invention, the stimulable phosphor employed for producing a chemiluminescent image may be of any type insofar as it can store the energy of light having a visible light wavelength and can be stimulated by an electromagnetic wave to release the energy of light having a visible light wavelength stored therein. However, a stimulable phosphor which can be stimulated by light having a visible light wavelength is preferably employed. More specifically, preferably employed stimulable phosphors include metal halophosphates, rare-earth-activated phosphors, aluminate-host phosphors, silicate-host phosphors and fluoride-host phosphors as disclosed in UK Patent Application 2,246,197 A.

The above and other objects and features of the present invention will become apparent from the following description made with reference to the accompanying drawings.

BRIEF DESCRIPTION OF THE DRAWINGS

The file of this patent contains at least one drawing executed in color.

DESCRIPTION OF THE PREFERRED EMBODIMENTS

Figure 1:
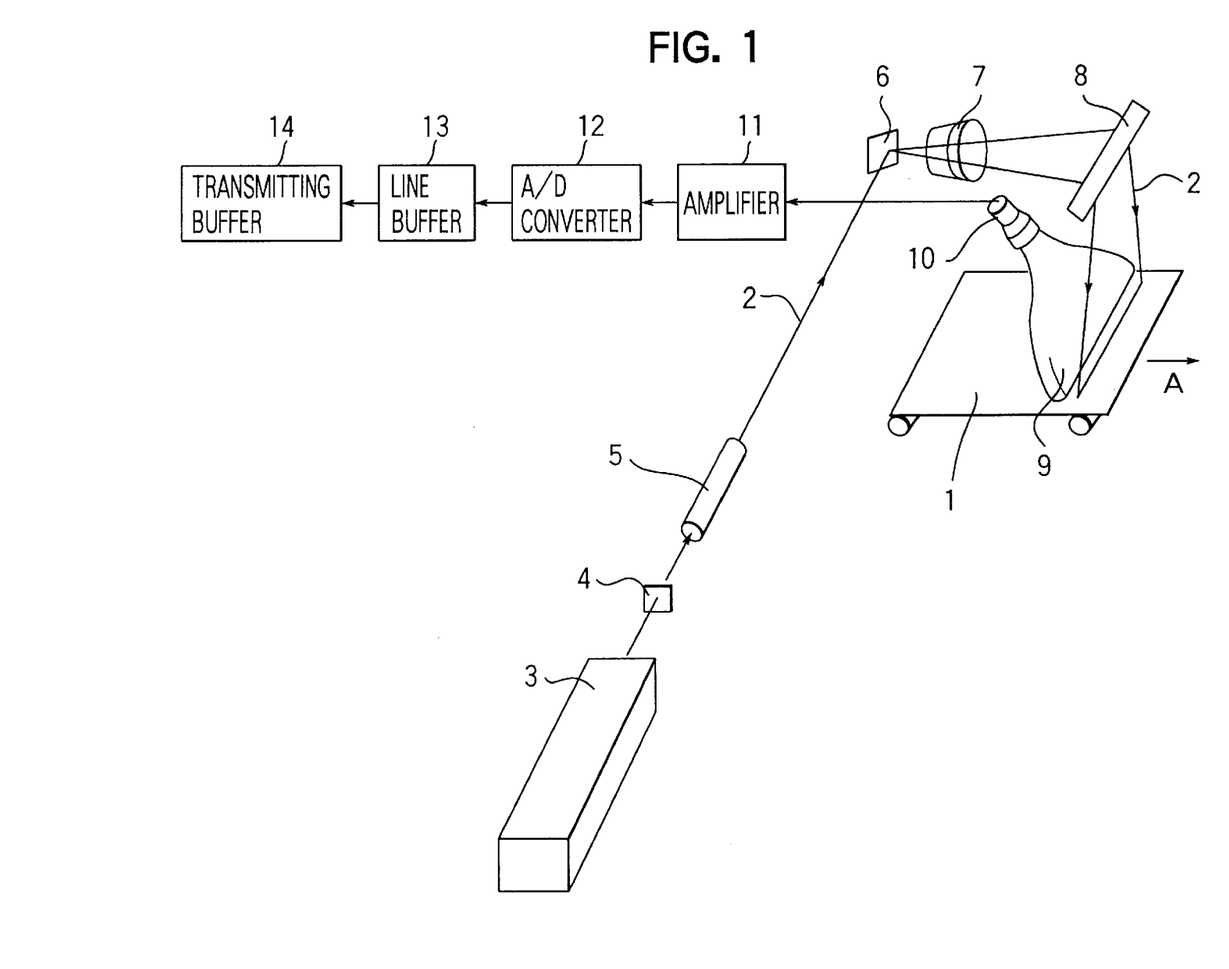
FIG. 1 is a schematic perspective view showing an image reading apparatus for producing image data on which an autoradiographic image forming apparatus, which is an embodiment of the present invention, forms an image.

A stimulable phosphor sheet 1 shown in FIG. 1 stores information regarding the location of a radioactive labeling material contained in a specimen (not shown) in the form of radioactive energy.

In this embodiment, the stimulable phosphor sheet 1 stores locational information regarding a radioactively labeled substance contained in a gene produced by the Southern blotting method and the hybridization method.

Locational information includes a variety of information relating to the location of radioactive labeled substances, or aggregations thereof that are present in a specimen, the shape, the concentration, the distribution of the substances or combination of these characteristics.

The locational information regarding a radioactively labeled substance is stored in the stimulable phosphor sheet 1, for example, in the following manner. First, a plurality of DNA fragments containing specific gene are separated and distributed on a gel support medium by means of electrophoresis and are denatured by alkali processing to form single-stranded DNA. Then, according to the known Southern blotting method, the gel support and a transfer support such as a nitrocellulose filter are placed in layers to transfer at least a part of the denatured DNA fragments onto the transfer support and the transferred DNA fragments are fixed on the transfer support by heating. Further, probes prepared by radioactively labeling DNA or RNA, which is complementary to the DNA containing the specific gene, and the denatured DNA fragments are hybridized by heating to form double-stranded DNA or combined DNA and RNA. Since the denatured DNAs are fixed on the transfer support at this time, only the DNA fragments which are complimentary to the probe DNA or probe RNA are hybridized to acquire the radioactively labeled probe. Then, the probes which have not formed hybrids are cleaned by a proper solution and only the DNA fragments having a specific gene form hybrids with the radioactively labeled DNA or RNA on the transfer support to be radioactively labeled. The thus obtained transfer support and the stimulable phosphor sheet 1 are placed in layers for a certain period of time to expose the stimulable phosphor sheet 1. At least a part of the radiation emitted from the radioactively labeled substance on the transfer support is absorbed in the stimulable phosphor sheet 1, whereby the locational information regarding the radioactively labeled substance in the specimen is stored in the stimulable phosphor sheet 1.

The stimulable phosphor sheet which stores the locational information regarding a radioactive material in the specimen is scanned with a laser beam 2 and stimulated, thereby emitting stimulated emission.

The laser beam 2 is generated by a laser beam source 3 and passes through a filter 4 to cut off light in the wavelength region corresponding to the wavelength region of radiation to be emitted from the stimulable phosphor sheet 1 in response to stimulation by the laser beam 2. The beam diameter of the laser beam 2 is accurately adjusted by a beam expander 5, and the laser beam 2 enters a beam deflector 6 such as a galvanometer. The laser beam 2 deflected by the beam deflector 6 passes through an fθ lens 7 and is reflected by a plane reflecting mirror 8, thereby impinging upon the stimulable phosphor sheet 1. The fθ lens 7 ensures that the stimulable phosphor sheet 1 is always scanned with the laser beam 2 at a uniform beam speed.

The stimulable phosphor sheet 1 is conveyed in the direction along the arrow in FIG. 1 in synchronism with the above mentioned scanning with the laser beam 2 so that the whole surface of the stimulable phosphor sheet 1 is scanned by the laser beam 2.

When irradiated with the laser beam 2, the stimulable phosphor sheet 1 releases emissions in an amount proportional to the radiation energy stored therein, and the stimulated emission enters a light guiding sheet 9.

The light receiving end of the light guiding sheet 9 has a linear shape and is positioned in the vicinity of the stimulable phosphor sheet 1 so as to face the scanning line on the stimulable phosphor sheet 1. The exit end of the light guiding sheet 9 is in the form of a ring and is connected to the light receiving surface of a light detector 10 such as a photomultiplier for photoelectrically detecting light. This light guiding sheet 9 is made by processing a transparent thermoplastic resin sheet such as an acrylic synthetic resin and is constituted such that the emission introduced from the light receiving end is transmitted to the exit end under repeated total reflection within the light guiding sheet 9 and is received by the light receiving surface of the light detector 10 at the exit end.

Therefore, the stimulated emission produced by the stimulable phosphor sheet 1 upon being irradiated with the laser beam 2 enters into the light guiding sheet 9 and is received by the light detector 10 via the exit end under repeated total reflection within the sheet 9.

On the light receiving surface of the light detector 10 is provided a filter which allows only light of the wavelength region of the stimulated emission released from the stimulable phosphor sheet 1 to pass through and cuts off light of the wavelength region of the laser beam so that the light detector 10 can photoelectrically detect only the stimulated emission released from the stimulable phosphor sheet 1.

The stimulated emission photoelectrically detected by the light detector 10 is converted to an electrical signal, amplified by an amplifier 11 having a predetermined amplifying factor so to produce an electrical signal of a predetermined level and then input to an A/D converter 12. The electrical signal is converted to a digital signal with a scale factor suitable for the signal fluctuation width and is input to a line buffer 13. The line buffer 13 temporarily stores image data corresponding to one scanning line. When the image data corresponding to one scanning line has been stored in the line buffer 13 in the above described manner, the line buffer 13 outputs the data to a transmitting buffer 14 whose capacity is greater than that of the line buffer 13 and when the transmitting buffer 14 has stored a predetermined amount of the image data, it outputs the image data to an autoradiographic image forming apparatus.

Figure 2:
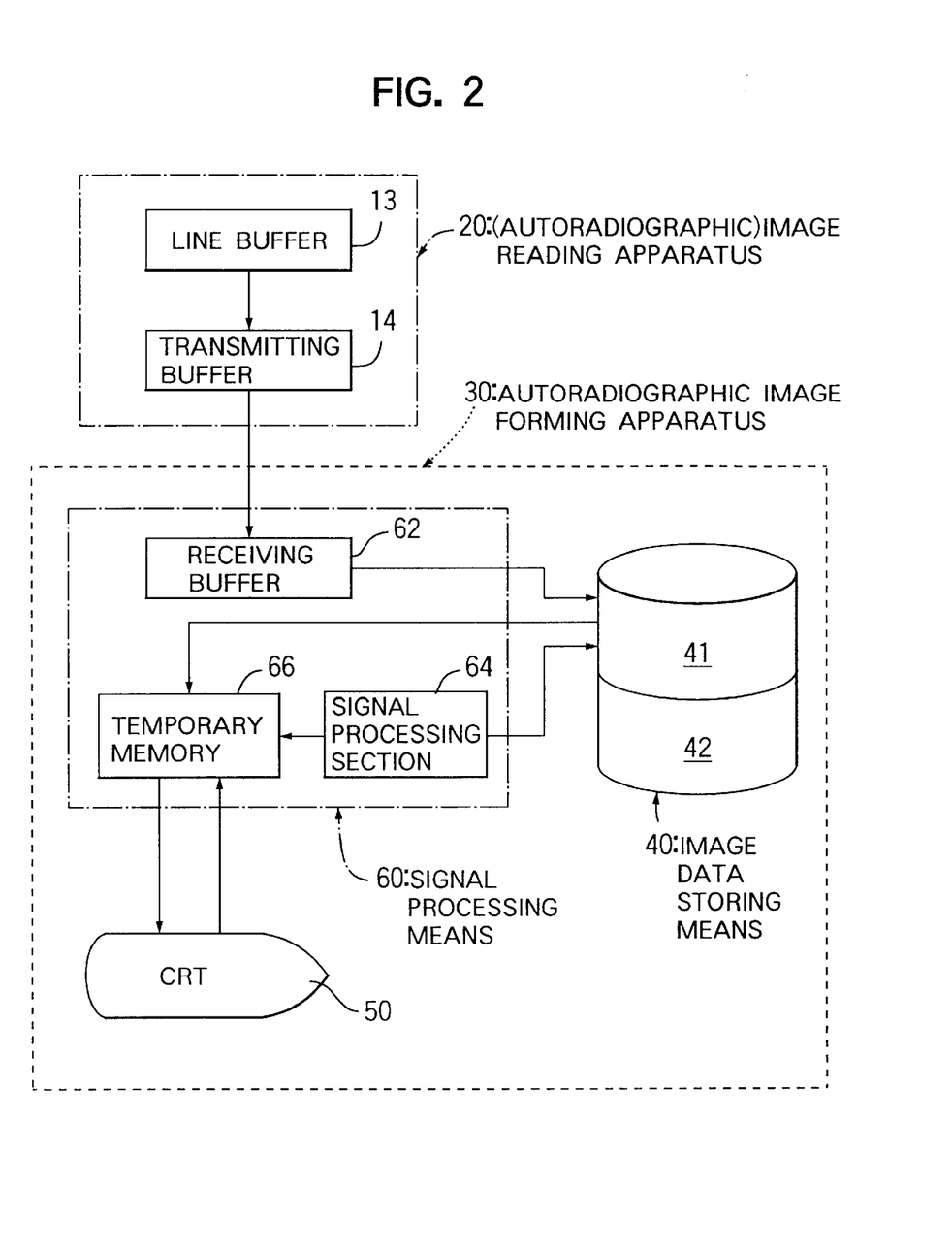
FIG. 2 is a block diagram of an autoradiographic image forming apparatus and an image reading apparatus.

FIG. 2 is a block diagram of the autoradiographic image forming apparatus and an image reading apparatus.

As shown in FIG. 2, the autoradiographic image forming apparatus 30 includes signal processing means 60 for receiving image data containing locational information regarding radioactive labeling material contained in a specimen. This data was stored and recorded in the stimulable phosphor sheet 1, read out by the image reading apparatus 20 and converted to a digital signal. The signal is processed to reproduce a visible image which has a desirable density, tone, contrast and the like, excellent for observation and analysis. Also included is an image data storing means 40 for storing image data which were input to the signal processing means 60 by the image reading apparatus 20 and processed thereby, and a CRT 50 for reproducing an image based on the image data containing locational information regarding radioactive labeling material contained in a specimen.

The image data temporarily stored in the transmitting buffer 14 of the image reading apparatus 20 are input to a receiving buffer 62 in the signal processing means 60 of the autoradiographic image analyzing apparatus 30 and temporarily stored therein. When a predetermined amount of the image data has been stored, the stored image data are output to an image data temporary storing section 41 in the image data storing means 40 and stored therein. In this manner, the image data fed from the transmitting buffer 14 of the image reading apparatus 20 to the receiving buffer 62 of the signal processing means 60 and temporarily stored therein are fed from the transmitting buffer 14 to the image data temporary storing section 41 in the image data storing means 40. When the image data obtained by scanning the whole surface of the stimulable phosphor sheet 1 with the laser beam 2 has been stored in the image data temporary storing section 41 in the image data storing means 40, the signal processing section 64 in the signal processing means 60 reads the image data from the image data temporary storing section 41 and stores them in a temporary memory 66 in the signal processing means 60. After the image data is subjected to necessary signal processing in the signal processing section 64, the signal processing section 64 stores only the signal-processed image data in a image data storing section 42 in the image data storing means 40. The signal processing section 64 then erases the image data stored in the image data temporary storing section 41.

The image data stored in the image data storing section 42 in the image data storing means 40 can be read by the signal processing section 64 and displayed on the CRT 50 so that an operator can view and analyze the image.

Figure 3:
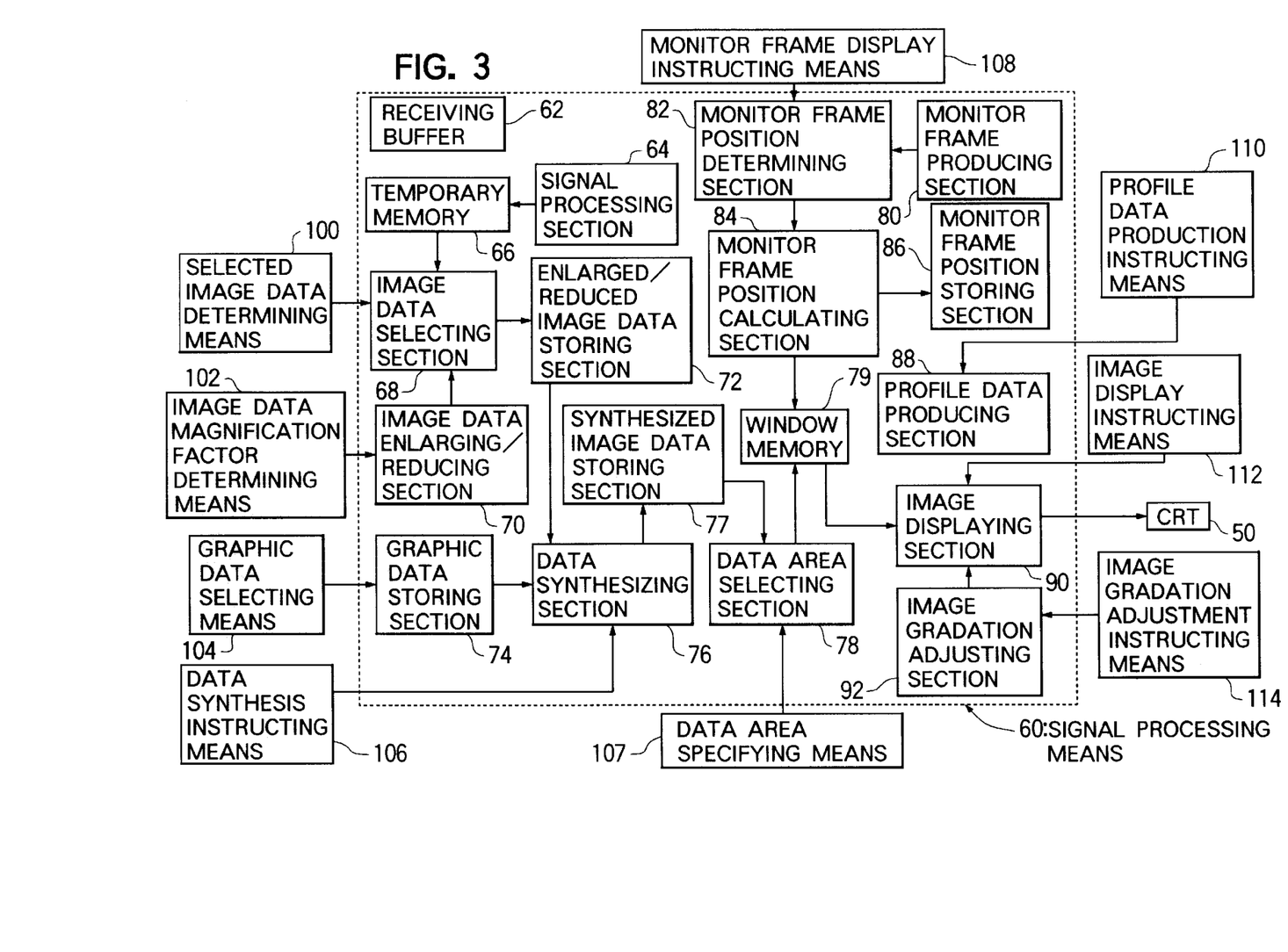
FIG. 3 is a block diagram of signal processing means.

FIG. 3 is a block diagram of the signal processing means 60. As shown in FIG. 3, the signal processing means 60 includes the receiving buffer 62 for receiving image data from the transmitting buffer 14 in the image reading apparatus 20, the signal processing section 64 for effecting signal processing and the temporary memory 66 for temporarily storing the image data. The temporary memory 66 is constituted so as to two-dimensionally map image data and temporarily store them.

The signal processing means 60 further includes an image data selecting section 68 for selecting a part of image data from among the image data temporarily stored in the temporary memory 66, an image data enlarging/reducing section 70 for enlarging or reducing the image data selected by the image data selecting section 68, an enlarged/reduced image data storing section 72 for two-dimensionally mapping and temporarily storing the image data enlarged or reduced by the image data enlarging/reducing section 70, a graphic data storing section 74 for storing various graphic data to be displayed on the CRT 50, a data synthesizing section 76 for synthesizing the image data temporarily stored in the image data enlarged/reduced storing section 72 and the graphic data stored in the graphic data storing section 74 and to be displayed on the CRT 50, a synthesized image data storing section 77 for two-dimensionally mapping and temporarily storing the image data and the graphic data synthesized by the data synthesizing section 76, a data area selecting section 78 for selecting a predetermined data area from among the image data and the graphic data temporarily stored in the synthesized image data storing section 77, a window memory 79 for two-dimensionally mapping and temporarily storing the data in the data area of the image data and graphic data selected by the data area selecting section 78, a monitor frame producing section 80 for two-dimensionally surrounding the image data two-dimensionally mapped and temporarily stored in the window memory 79 and specifying the image data therein, a monitor frame position determining section 82 for determining the position of the monitor frame produced in the window memory 79, a monitor frame position calculating section 84 for calculating the position of the monitor frame in the window memory 79, a monitor frame position storing section 86, a profile data producing section 88 for producing profile data corresponding to the gradation of an image of the image data surrounded by the monitor frame produced in the window memory 79, an image displaying section 90 for displaying areas of the image data and the graphic data selected by the data area selecting section 77 and temporarily stored in the window memory 79, monitor frame position data stored in the monitor frame position storing section 86 and the profile data produced by the profile data producing section 88 on the CRT 50 and an image gradation adjusting section 92 for adjusting the gradation of a specific area in an image specified in the window memory 79 by the monitor frame produced by the monitor frame producing section 88 and displayed on the CRT 50 by the image displaying section 90 based on a profile image corresponding to the profile data of the image data produced by the profile data producing section 88.

An image data selecting signal is input to the image data selecting section 68 from a selected image date determining section 100 and an enlarging/reducing signal is input to the image data enlarging/reducing section 70 from an image data magnification factor determining section 102. Further, a graphic data selecting signal is input to the graphic data storing section 74 from graphic data selecting means 104 and a data synthesizing signal is input to the data synthesizing section 76 from data synthesis instructing means 106 which determines what graphic data should be selected and how the image data and the graphic data are to be synthesized to be displayed on the CRT 50. Moreover, a data area specifying signal is input to the data area selecting section 78 from data area specifying means 107. Further, a monitor frame display instructing signal is input to the monitor frame producing section 80 and the monitor frame position determining section 82 from monitor frame display instructing means 108. A profile data producing signal is input to the profile data producing section 88 from profile data production instructing means 110. Furthermore, an image displaying signal is input to the image displaying section 90 from image display instructing means 112 and a gradation adjustment instructing signal is input to the image gradation adjusting section 92 from the image gradation adjustment instructing means 114.

The selected image data determining section 100, the image data magnification factor determining section 102, the graphic data selecting means 104, the data synthesis instructing means 106, the data area specifying means 107, the monitor frame display instructing means 108, the profile data production instructing means 110, the image display instructing means 112 and the image gradation adjustment instructing means 114 can be operated by a mouse (not shown).

Figure 4:
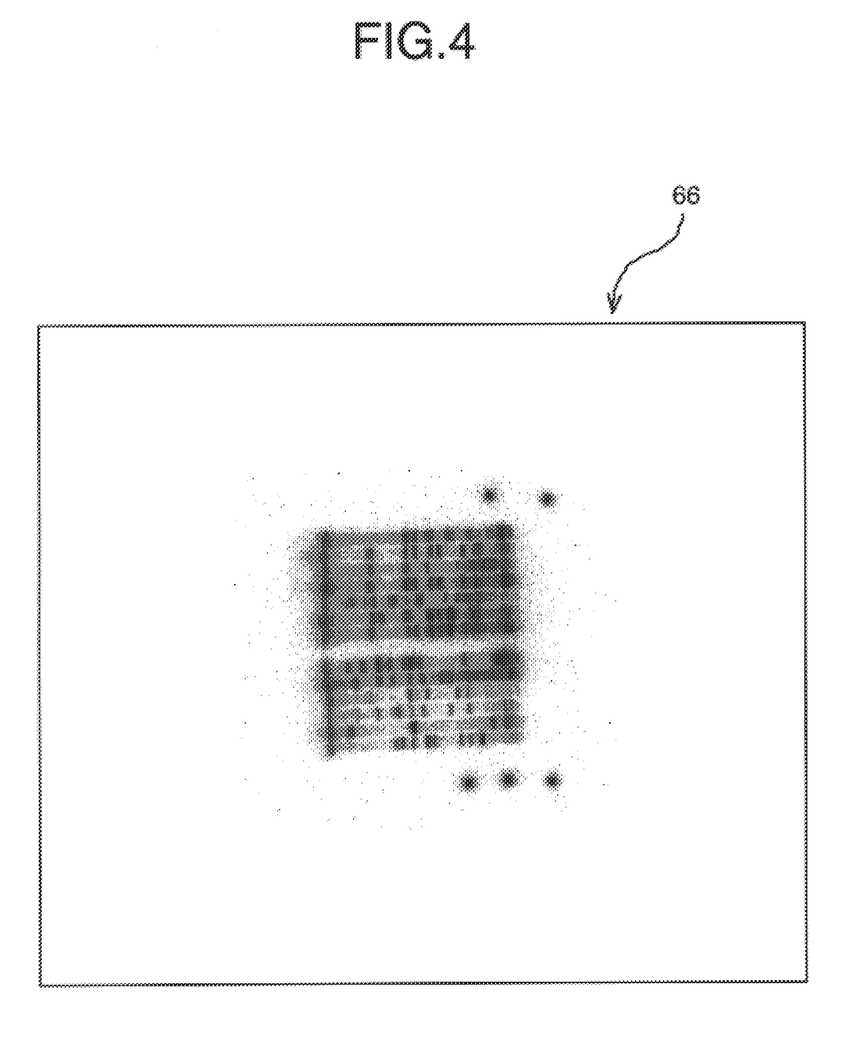
FIG. 4 shows one example of an image displayed on a CRT based on image data two-dimensionally mapped and temporarily stored in a temporary memory.

FIG. 4 shows one example of an image displayed on the CRT 50 based on image data two-dimensionally mapped and temporarily stored in the temporary memory 66. The image data for the whole image are two-dimensionally mapped and stored in the temporary memory 66.

Figure 5:
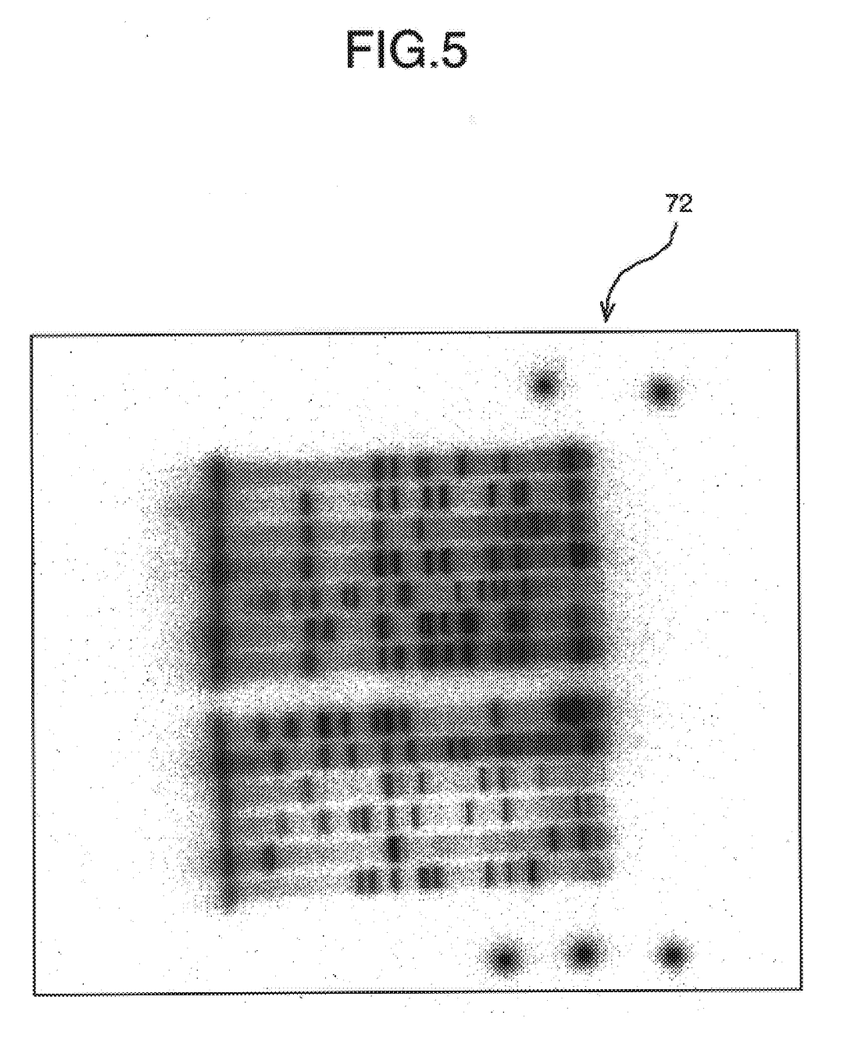
FIG. 5 shows one example of an image displayed on a CRT based on image data obtained by operating an image data selecting means to select a part of image data stored in temporary memory, operating an image data magnification means to enlarge the selected image data and two-dimensionally mapping and temporarily storing the image data in an enlarged/reduced image data storing section.

FIG. 5 shows one example of an image displayed on the CRT 50 based on the image data obtained by operating the selected image data determining means 100 to select a part of the image data stored in the temporary memory 66, operating the image data magnification factor determining means 102 to enlarge the selected image data and two-dimensionally mapping and temporarily storing the image data in the enlarged/reduced image data storing section 72. As shown in FIG. 5, a part of the image data two-dimensionally mapped and temporarily stored in the temporary memory 66 are enlarged, two-dimensionally mapped and stored in the enlarging/reduced image data storing section 72.

Figure 6:
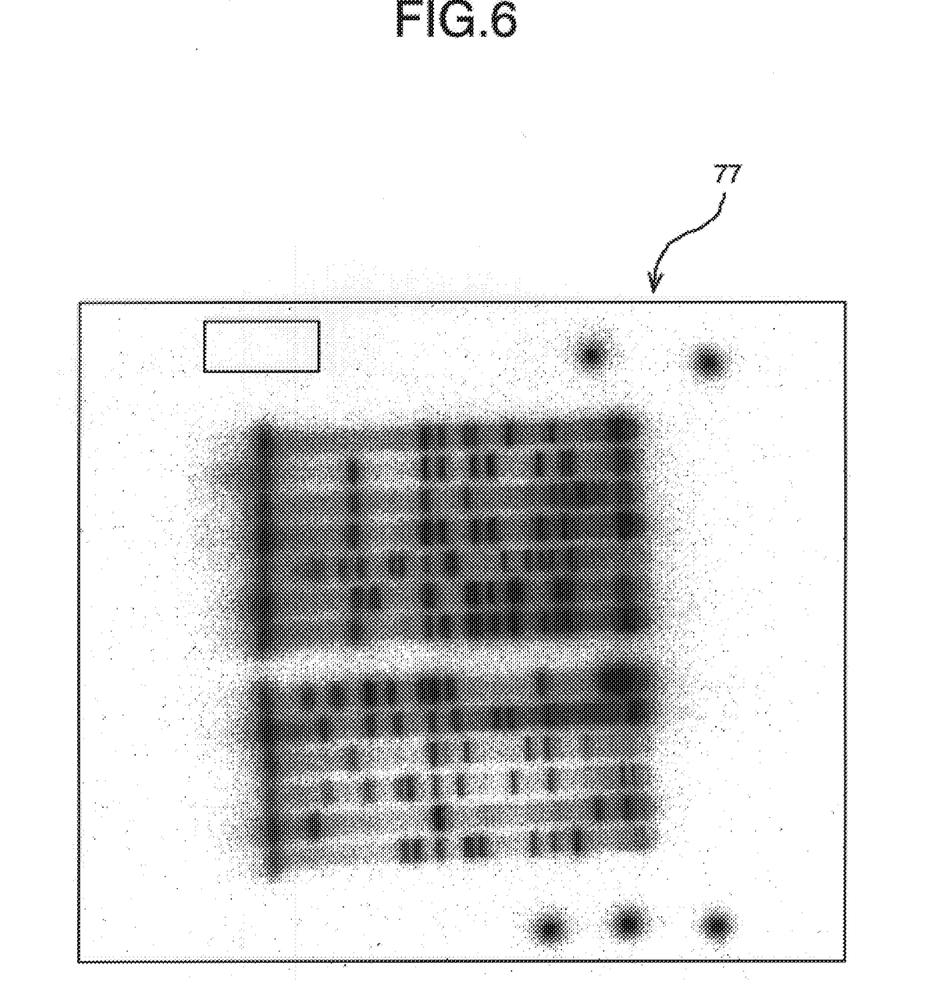
FIG. 6 shows one example of an image displayed on a CRT based on image data obtained by operating a graphic data selecting means and data synthesis means to synthesize the image data two-dimensionally mapped and temporarily stored in an enlarged/reduced image data storing section with the selected graphic data and two-dimensionally mapping and temporarily storing the image data in a synthesized data storing section.

FIG. 6 shows one example of an image displayed on the CRT 50 based on the image data obtained by operating the graphic data selecting means 104 and the data synthesis instructing means 106 to synthesize the image data two-dimensionally mapped and temporarily stored in the enlarging/reduced image data storing section 72 and predetermined graphic data and two-dimensionally mapping and temporarily storing the image data in the synthesized data storing section 77. As shown in FIG. 6, the image data two-dimensionally mapped and temporarily stored in the enlarging/reduced image data storing section 72 and the predetermined graphic data are synthesized, two-dimensionally mapped and stored in the synthesized data storing section 77.

Figure 7:
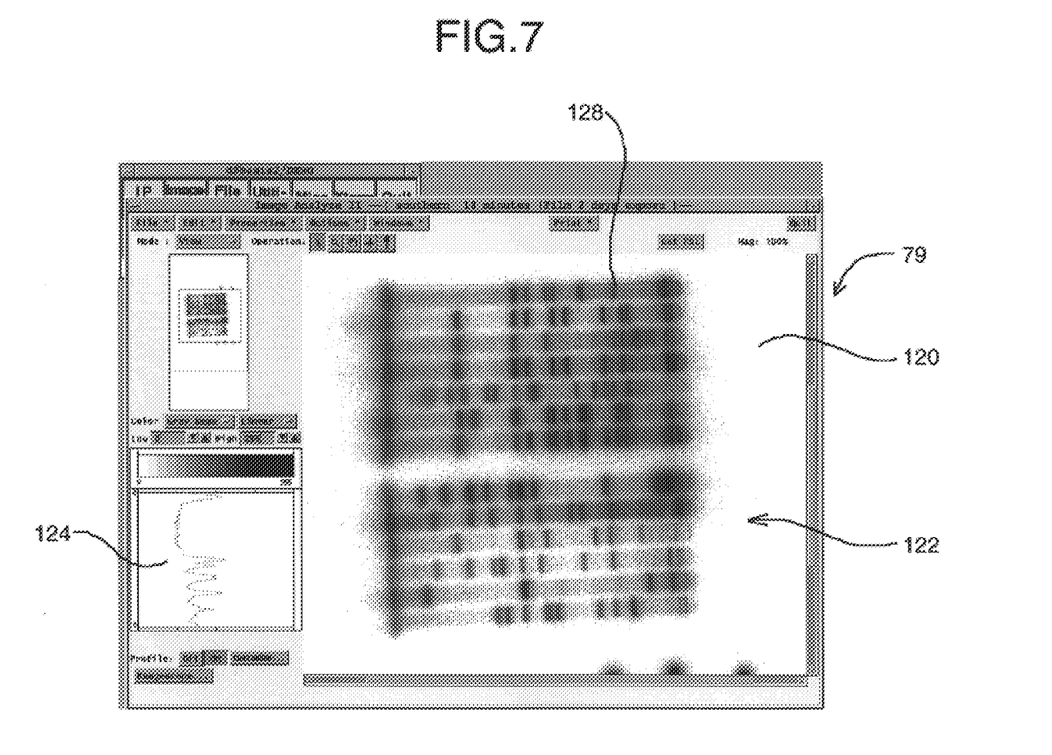
FIG. 7 shows one example of an image displayed on a CRT based on the image data two-dimensionally mapped and temporarily stored in a window memory when a monitor frame is produced by operating a monitor frame display instructing means.

FIG. 7 shows one example of an image displayed on the CRT 50 based on the image data two-dimensionally mapped and temporarily stored in the window memory 79 when the monitor frame is produced by operating the monitor frame display instructing means 108. As shown in FIG. 7, a part of the image data 122 consisting of the image data and the graphic data two-dimensionally mapped and temporarily stored in the synthesized data storing section 77 are stored in a window portion 120 of the window memory 79 together with the monitor frame produced by the monitor frame producing section 80 and a profile display section 124 in which profile data are to be displayed is stored in the remaining portion of the window memory 79.

When an operator uses a mouse (not shown) to operate the image display instructing means 112 in this state and inputs an image display instructing signal to the image displaying section 90, the same image as that in FIG. 7 is displayed on the CRT 50.

In the thus constituted autoradiographic image forming apparatus, it is possible to enlarge, reduce or scroll an image displayed on the CRT 50 depending on the image area to be viewed and analyzed.

For enabling the image displayed on the CRT 50 to be enlarged or reduced depending on the image area to be viewed and analyzed, this embodiment is constituted so that the operator uses a mouse to operate the image data magnification factor determining means 102 and inputs an enlarging/reducing signal to the image data enlarging/reducing section 70, whereby the enlarged or reduced image data can be two-dimensionally mapped and temporarily stored in the image data enlarging/reducing section 70.

Further, the operator uses a mouse to operate the selected image data determining means 100 and inputs an image data selecting signal to the image data selecting section 68, thereby scrolling an image displayed on the CRT 50. In this case, image data specified by the selected image data determining means 100 are selected from the temporary memory 66 through the image data selecting section 68. The selected image data are two-dimensionally mapped and temporarily stored in the enlarged/reduced image data storing section 72 after being enlarged or reduced, or not enlarged or reduced, by the image data enlarging/reducing section 70. Further, the thus stored image data and selected graphic data are synthesized in the data synthesizing section 76 and are two-dimensionally mapped and temporarily stored in the synthesized data storing section 77. Then, an area of the image data and the graphic data stored in the synthesized data storing section 77 are selected by the data area selecting section 78 and are two-dimensionally mapped and temporarily stored in the window memory 79. Based on these image data and the graphic data, an image displayed on the CRT 50 can be scrolled by the image displaying section 90. However, it is difficult to scroll the image displayed on the CRT 50 at a high speed by this operation. Therefore, this embodiment is provided with the data selecting section 78 for selecting an area of data consisting of the image data and the graphic data stored in the synthesized image data storing section 77 and two-dimensionally mapping and temporarily storing it in the window memory 79. Thus, the operator uses a mouse to input a data area selecting signal to the data area selecting means 107, thereby specifying the area of the image data and the graphic data to be two-dimensionally mapped and temporarily stored in the window memory 79 and can scroll the image displayed on the CRT 50 at a high speed within the range of data consisting of the image data and the graphic data stored in the synthesized image data storing section 77.

By operating a first button (not shown) or a second button (not shown) provided on a mouse, it is possible to select whether the image displayed on the CRT is scrolled by the image data selecting section 68 or the data selecting section 78.

In this manner, the operator can scroll the image displayed on the CRT 50 depending on the image area to be viewed and analyzed after the image data have been enlarged or reduced, or without their being enlarged or reduced, and position the image area to be viewed and analyzed within a monitor frame 128. Further, the operator can use a mouse to operate the profile producing means 110 and input a profile data production instruction signal to the profile producing section 88, whereby the gradation profile of the image area surrounded by the monitor frame 128 on the CRT 50 can be displayed in the profile displaying portion 124 and can be viewed and analyzed. As a result, when the operator judges that the gradation profile of the image area within the monitor frame 128 should be adjusted to make it suitable for viewing and analyzing, the operator uses a mouse to operate the image gradation adjustment instructing means 114 and inputs a gradation adjustment instructing signal to the image gradation adjusting section 92, thereby adjusting the gradation profile of the image area within the monitor frame 128.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, the locational information regarding a gene obtained by the Southern blotting method and the hybridization method is stored in the stimulable phosphor sheet 1, photoelectrically read out, signal-processed in a predetermined manner and displayed on the CRT 50 and the gradation profile of the image area to be viewed and analyzed is adjusted. However, the present invention is not limited to such autoradiography and can also be applied to autoradiographic images such as an autoradiographic image of a protein produced by thin layer chromatography (TLC), an autoradiographic image produced by polyacrylamide gel electrophoresis for the separation or identification of protein or the estimation of molecular weight or properties of protein or the like, an autoradiographic image for studying the metabolism, absorption, excretion path and state of a substance introduced into a test animal such as a mouse. Further, the present invention is applicable for producing density profiles of chemiluminescent images produced by a chemiluminescent process such as a chemiluminescent image of a gene produced by the Southern blot hybridization method, a chemiluminescent image of a protein produced by thin layer chromatography, a chemiluminescent image produced by polyacrylamide gel electrophoresis for the separation or identification of a protein or the estimation of molecular weight or properties of a protein or the like. Moreover, the present invention can be widely applied to produce density profiles of an electron beam transmission image or an electron beam diffraction image of a metal or nonmetal produced by an electron microscope, an electron beam image of tissue of an organism and a radiographic diffraction image of a metal or nonmetal.

Further, although in the above described embodiment an image displayed on the CRT 50 is enlarged or reduced and scrolled to position an image area to be viewed and analyzed within the monitor frame 128 and the gradation of the image area is adjusted, the present invention also enables an image displayed on the CRT 50 to be enlarged or reduced and scrolled and the monitor frame 128 to be moved so that the image area to be viewed and analyzed can be positioned within the monitor frame 128 and that the gradation of the image area can be adjusted.

Furthermore, although in the above described embodiment an image area to be viewed and analyzed is specified by the monitor frame 128 and the gradation profile of the image within the area is produced, the gradation profile of an image within an image area may be instead produced by operating the data synthesis instructing means 106 to store graphic data corresponding to a rectangular pattern, circular pattern or the like at a predetermined position in the synthesized image data storing section 77, displaying the corresponding pattern on the CRT 50 and surrounding an image area to be viewed and analyzed on the CRT 50 to identify the image area.

Moreover, in the above described embodiment, although the image data are produced by using the stimulable phosphor sheet 1 and converting locational information regarding a radioactive labeling substance to an electrical signal and are displayed on the CRT 50 as a visible image, it is possible to once form a visible image on a photographic film instead of the stimulable phosphor sheet 1, photoelectrically read the visible image, convert it to an electrical signal and process the thus obtained image data in a similar manner to the above.

Further, in the present invention, the respective means, need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image forming apparatus for forming a visible image on display means such as a CRT based on image data which can scroll the image formed on the display means such as a CRT at a high speed.

We claim:

1. An image forming apparatus comprising:

image data storing means for storing image data;

temporary memory means for two-dimensionally mapping and temporarily storing the image data stored in the image data storing means;

image data selecting means for selecting data from among the two-dimensionally mapped image data temporarily stored in the temporary memory means;

image data size adjustment means for adjusting the size of the data selected by the image data selecting means;

size-adjusted image data storing means for two-dimensionally mapping and temporarily storing the data adjusted by the image data size adjustment means;

graphic data storing means for storing graphic data;

data synthesizing means for selecting graphic data to be displayed by said image forming apparatus from among graphic data stored in the graphic data storing means and for synthesizing the selected graphic data and the two-dimensionally mapped image data temporarily stored in the size-adjusted image data storing means;

synthesized data storing means for two-dimensionally mapping and temporarily storing the image data and the graphic data synthesized by the data synthesizing means;

data area selecting means for selecting a part of the data area stored in the synthesized data storing means;

window memory means for two-dimensionally mapping and temporarily storing the selected part of the data area selected by the data area selecting means; and image displaying means for displaying an image based on the two-dimensionally mapped data temporarily stored in the window memory means.

2. An image forming apparatus in accordance with claim 1 wherein the image data is produced using a stimulable phosphor sheet.

3. An image forming apparatus in accordance with claim 1 wherein the image data comprise image data selected from at least one of autoradiographic image data, radiographic diffraction image data, electron microscopic image data, and chemiluminescent image data.

4. An image forming apparatus in accordance with claim 2 wherein the image data comprise image data selected at least one of autoradiographic image data, radiographic diffraction image data, electron microscopic image data, and chemiluminescent image data.

5. An image forming apparatus in accordance with claim 3 wherein the autoradiographic image data, the radiographic diffraction image data, and the electron microscopic image data are produced by absorbing and storing the energy of a radiation or an electron beam, emitted from a specimen, in a stimulable phosphor, irradiating the stimulable phosphor with an electromagnetic wave and photoelectrically converting light emitted from the stimulable phosphor.

6. An image forming apparatus in accordance with claim 4 wherein the autoradiographic image data, the radiographic diffraction image data, and the electron microscopic image data are produced by absorbing and storing the energy of a radiation or an electron beam, emitted from a specimen, in a stimulable phosphor, irradiating the stimulable phosphor with an electromagnetic wave and photoelectrically converting light emitted from the stimulable phosphor.

7. An image forming apparatus in accordance with claim 3 wherein the chemiluminescent image data are produced by absorbing and storing the energy of visible light, emitted from a specimen, in a stimulable phosphor, irradiating the stimulable phosphor with an electromagnetic wave and photoelectrically converting light emitted from the stimulable phosphor.

8. An image forming apparatus in accordance with claim 4 wherein the chemiluminescent image data are produced by absorbing and storing the energy of visible light, emitted from a specimen, in a stimulable phosphor, irradiating the stimulable phosphor with an electromagnetic wave and photoelectrically converting light emitted from the stimulable phosphor.

* * * * *